United States Patent
Segal et al.

(10) Patent No.: US 10,120,792 B1
(45) Date of Patent: Nov. 6, 2018

(54) PROGRAMMING AN EMBEDDED FLASH STORAGE DEVICE

(71) Applicant: AVAGO TECHNOLOGIES GENERAL IP (SINGAPORE) PTE. LTD., Yishun (SG)

(72) Inventors: Avigdor Segal, Netanya (IL); Hanan Weingarten, Herzelia (IL); Igal Maly, Tel Aviv (IL); Irena Shemesh, Haifa (IL)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 463 days.

(21) Appl. No.: 14/167,879

(22) Filed: Jan. 29, 2014

(51) Int. Cl.
*G06F 12/00* (2006.01)
*G06F 12/02* (2006.01)
*G06F 3/06* (2006.01)

(52) U.S. Cl.
CPC ........ *G06F 12/0246* (2013.01); *G06F 3/0611* (2013.01); *G06F 3/0659* (2013.01); *G06F 3/0679* (2013.01); *G06F 2212/7207* (2013.01)

(58) Field of Classification Search
CPC ............. G06F 12/0679; G06F 12/0611; G06F 12/0659; G06F 12/0246; G06F 2212/7207
See application file for complete search history.

(56) References Cited

U.S. PATENT DOCUMENTS

| | | |
|---|---|---|
| 4,430,701 A | 2/1984 | Christian et al. |
| 4,463,375 A | 7/1984 | Macovski |
| 4,584,686 A | 4/1986 | Fritze |
| 4,589,084 A | 5/1986 | Fling et al. |
| 4,777,589 A | 10/1988 | Boettner et al. |
| 4,866,716 A | 9/1989 | Weng |
| 5,003,597 A | 3/1991 | Merkle |

(Continued)

FOREIGN PATENT DOCUMENTS

WO    WO2009053963 A2    4/2009

OTHER PUBLICATIONS

Search Report of PCT Patent Application WO 2009/118720 A3, dated Mar. 4, 2010.

(Continued)

*Primary Examiner* — Kalpit Parikh
(74) *Attorney, Agent, or Firm* — Sheridan Ross P.C.

(57) ABSTRACT

A method that includes sending to an embedded flash storage device (EFSD) and during a transaction, a data unit and recovery metadata that differs from a flash memory unit memory management data structure (FMUMMDS); instructing the EFSD to program the data unit and the recovery metadata to a group of flash memory cells; sending to the host computer a transaction completion indication in response to a successful completion of the programming and before a completion of a management process that comprises updating by the flash memory controller, the FMUMMDS to reflect (a) the recovery metadata and (b) physical address information related to the group of the flash memory cells; and programming, by the EFSD, the FMUMMDS to the flash memory unit; wherein the data structure is reconstructible based upon the recovery metadata and the physical address information related to the group of the flash memory cells.

20 Claims, 9 Drawing Sheets

(56) References Cited

U.S. PATENT DOCUMENTS

| | | |
|---|---|---|
| 5,077,737 A | 12/1991 | Leger et al. |
| 5,297,153 A | 3/1994 | Baggen et al. |
| 5,305,276 A | 4/1994 | Uenoyama |
| 5,592,641 A | 1/1997 | Doyle et al. |
| 5,623,620 A | 4/1997 | Ranjeet et al. |
| 5,640,529 A | 6/1997 | Hasbun |
| 5,657,332 A | 8/1997 | Auclair et al. |
| 5,663,901 A | 9/1997 | Harari et al. |
| 5,724,538 A | 3/1998 | Morris |
| 5,729,490 A | 3/1998 | Calligaro et al. |
| 5,740,395 A | 4/1998 | Hasbun |
| 5,745,418 A | 4/1998 | Hu et al. |
| 5,778,430 A | 7/1998 | Ish |
| 5,793,774 A | 8/1998 | Usui et al. |
| 5,920,578 A | 7/1999 | Zook et al. |
| 5,926,409 A | 7/1999 | Engh et al. |
| 5,933,368 A | 8/1999 | Hu et al. |
| 5,956,268 A | 9/1999 | Lee |
| 5,956,473 A | 9/1999 | Hu et al. |
| 5,968,198 A | 10/1999 | Balachandran |
| 5,982,659 A | 11/1999 | Irrinki et al. |
| 6,011,741 A | 1/2000 | Harari et al. |
| 6,016,275 A | 1/2000 | Han |
| 6,038,634 A | 3/2000 | Ji et al. |
| 6,081,878 A | 6/2000 | Estakhri |
| 6,094,465 A | 7/2000 | Stein et al. |
| 6,119,245 A | 9/2000 | Hiratsuka |
| 6,182,261 B1 | 1/2001 | Haller et al. |
| 6,192,497 B1 | 2/2001 | Yang et al. |
| 6,195,287 B1 | 2/2001 | Hirano |
| 6,199,188 B1 | 3/2001 | Shen et al. |
| 6,209,114 B1 | 3/2001 | Wolf et al. |
| 6,256,749 B1 * | 7/2001 | Kakuta ............ G06F 11/1076 711/161 |
| 6,259,627 B1 | 7/2001 | Wong |
| 6,272,052 B1 | 8/2001 | Miyauchi |
| 6,278,633 B1 | 8/2001 | Wong et al. |
| 6,279,133 B1 | 8/2001 | Vafai et al. |
| 6,301,151 B1 | 10/2001 | Engh et al. |
| 6,370,061 B1 | 4/2002 | Yachareni et al. |
| 6,374,383 B1 | 4/2002 | Weng |
| 6,504,891 B1 | 1/2003 | Chevallier |
| 6,532,169 B1 | 3/2003 | Mann et al. |
| 6,532,556 B1 | 3/2003 | Wong et al. |
| 6,553,533 B2 | 4/2003 | Demura et al. |
| 6,560,747 B1 | 5/2003 | Weng |
| 6,637,002 B1 | 10/2003 | Weng et al. |
| 6,639,865 B2 | 10/2003 | Kwon |
| 6,674,665 B1 | 1/2004 | Mann et al. |
| 6,675,281 B1 | 1/2004 | Oh |
| 6,704,902 B1 | 3/2004 | Shinbashi et al. |
| 6,751,766 B2 | 6/2004 | Guterman et al. |
| 6,772,274 B1 | 8/2004 | Estakhri |
| 6,781,910 B2 | 8/2004 | Smith |
| 6,792,569 B2 | 9/2004 | Cox et al. |
| 6,873,543 B2 | 3/2005 | Smith et al. |
| 6,891,768 B2 | 5/2005 | Smith et al. |
| 6,914,809 B2 | 7/2005 | Hilton et al. |
| 6,915,477 B2 | 7/2005 | Gollamudi et al. |
| 6,952,365 B2 | 10/2005 | Gonzalez et al. |
| 6,961,890 B2 | 11/2005 | Smith |
| 6,968,421 B2 | 11/2005 | Conley |
| 6,990,012 B2 | 1/2006 | Smith et al. |
| 6,996,004 B1 | 2/2006 | Fastow et al. |
| 6,999,854 B2 | 2/2006 | Roth |
| 7,010,739 B1 | 3/2006 | Feng et al. |
| 7,012,835 B2 | 3/2006 | Gonzalez et al. |
| 7,038,950 B1 | 5/2006 | Hamilton et al. |
| 7,068,539 B2 | 6/2006 | Guterman et al. |
| 7,079,436 B2 | 7/2006 | Perner et al. |
| 7,149,950 B2 | 12/2006 | Spencer et al. |
| 7,177,977 B2 | 2/2007 | Chen et al. |
| 7,188,228 B1 | 3/2007 | Chang et al. |
| 7,191,379 B2 | 3/2007 | Adelmann et al. |
| 7,196,946 B2 | 3/2007 | Chen et al. |
| 7,203,874 B2 | 4/2007 | Roohparvar |
| 7,212,426 B2 | 5/2007 | Park |
| 7,290,203 B2 | 10/2007 | Emma et al. |
| 7,292,365 B2 | 11/2007 | Knox |
| 7,301,928 B2 | 11/2007 | Nakabayashi et al. |
| 7,315,916 B2 | 1/2008 | Bennett |
| 7,388,781 B2 | 6/2008 | Litsyn |
| 7,395,404 B2 | 7/2008 | Gorobets |
| 7,441,067 B2 | 10/2008 | Gorobets et al. |
| 7,443,729 B2 | 10/2008 | Li |
| 7,450,425 B2 | 11/2008 | Aritome |
| 7,454,670 B2 | 11/2008 | Kim et al. |
| 7,466,575 B2 | 12/2008 | Shalvi et al. |
| 7,533,328 B2 | 5/2009 | Alrod et al. |
| 7,558,109 B2 | 7/2009 | Brandman et al. |
| 7,593,263 B2 | 9/2009 | Sokolov et al. |
| 7,610,433 B2 | 10/2009 | Randell et al. |
| 7,613,043 B2 | 11/2009 | Cornwell |
| 7,619,922 B2 | 11/2009 | Li |
| 7,697,326 B2 | 4/2010 | Sommer et al. |
| 7,706,182 B2 | 4/2010 | Shalvi et al. |
| 7,716,538 B2 | 5/2010 | Gonzalez |
| 7,804,718 B2 | 9/2010 | Kim |
| 7,805,663 B2 | 9/2010 | Brandman et al. |
| 7,805,664 B1 | 9/2010 | Yang et al. |
| 7,844,877 B2 | 11/2010 | Litsyn et al. |
| 7,911,848 B2 | 3/2011 | Eun |
| 7,961,797 B1 | 6/2011 | Yang et al. |
| 7,975,192 B2 | 7/2011 | Sommer |
| 8,020,073 B2 | 9/2011 | Emma et al. |
| 8,108,590 B2 | 1/2012 | Chow et al. |
| 8,122,328 B2 | 2/2012 | Liu et al. |
| 8,159,881 B2 | 4/2012 | Yang |
| 8,190,961 B1 | 5/2012 | Yang |
| 8,250,324 B2 | 8/2012 | Haas |
| 8,300,823 B2 | 10/2012 | Bojinov |
| 8,305,812 B2 | 11/2012 | Levy |
| 8,327,246 B2 | 12/2012 | Weingarten |
| 8,407,560 B2 | 3/2013 | Ordentlich |
| 8,417,893 B2 | 4/2013 | Khmelnitsky |
| 2001/0034815 A1 | 10/2001 | Dugan et al. |
| 2002/0063774 A1 | 5/2002 | Hillis et al. |
| 2002/0085419 A1 | 7/2002 | Kwon |
| 2002/0154769 A1 | 10/2002 | Petersen et al. |
| 2002/0156988 A1 | 10/2002 | Toyama |
| 2002/0174156 A1 | 11/2002 | Birru |
| 2003/0014582 A1 | 1/2003 | Nakanishi |
| 2003/0065876 A1 | 4/2003 | Lasser |
| 2003/0101404 A1 | 5/2003 | Zhao et al. |
| 2003/0105620 A1 | 6/2003 | Bowen |
| 2003/0177300 A1 | 9/2003 | Lee |
| 2003/0192007 A1 | 10/2003 | Miller et al. |
| 2004/0015771 A1 | 1/2004 | Lasser et al. |
| 2004/0030971 A1 | 2/2004 | Tanaka |
| 2004/0059768 A1 | 3/2004 | Denk |
| 2004/0080985 A1 | 4/2004 | Chang et al. |
| 2004/0153722 A1 | 8/2004 | Lee |
| 2004/0153817 A1 | 8/2004 | Norman |
| 2004/0181735 A1 | 9/2004 | Xin |
| 2004/0203591 A1 | 10/2004 | Lee |
| 2004/0210706 A1 | 10/2004 | In et al. |
| 2005/0013165 A1 | 1/2005 | Ban |
| 2005/0018482 A1 | 1/2005 | Cemea et al. |
| 2005/0083735 A1 | 4/2005 | Chen et al. |
| 2005/0117401 A1 | 6/2005 | Chen et al. |
| 2005/0120265 A1 | 6/2005 | Pline et al. |
| 2005/0128811 A1 | 6/2005 | Kato et al. |
| 2005/0138533 A1 | 6/2005 | Le-Bars et al. |
| 2005/0144213 A1 | 6/2005 | Simkins et al. |
| 2005/0144368 A1 | 6/2005 | Chung et al. |
| 2005/0169057 A1 | 8/2005 | Shibata |
| 2005/0172179 A1 | 8/2005 | Brandenberger et al. |
| 2005/0213393 A1 | 9/2005 | Lasser |
| 2005/0243626 A1 | 11/2005 | Ronen |
| 2006/0059406 A1 | 3/2006 | Micheloni et al. |
| 2006/0059409 A1 | 3/2006 | Lee |
| 2006/0064537 A1 | 3/2006 | Oshima |
| 2006/0101193 A1 | 5/2006 | Murin |
| 2006/0195651 A1 | 8/2006 | Estakhri |

(56) References Cited

U.S. PATENT DOCUMENTS

| | | |
|---|---|---|
| 2006/0203587 A1 | 9/2006 | Li et al. |
| 2006/0221692 A1 | 10/2006 | Chen |
| 2006/0248434 A1 | 11/2006 | Radke et al. |
| 2006/0268608 A1 | 11/2006 | Noguchi et al. |
| 2006/0282411 A1 | 12/2006 | Fagin et al. |
| 2006/0284244 A1 | 12/2006 | Forbes |
| 2006/0294312 A1 | 12/2006 | Walmsley |
| 2007/0025157 A1 | 2/2007 | Wan et al. |
| 2007/0063180 A1 | 3/2007 | Asano et al. |
| 2007/0081388 A1 | 4/2007 | Joo |
| 2007/0098069 A1 | 5/2007 | Gordon |
| 2007/0103992 A1 | 5/2007 | Sakui et al. |
| 2007/0104004 A1 | 5/2007 | So et al. |
| 2007/0109858 A1 | 5/2007 | Conley et al. |
| 2007/0124652 A1 | 5/2007 | Litsyn et al. |
| 2007/0136509 A1* | 6/2007 | Agami .............. G06F 3/0616 711/103 |
| 2007/0140006 A1 | 6/2007 | Chen |
| 2007/0143561 A1 | 6/2007 | Gorobets |
| 2007/0150694 A1 | 6/2007 | Chang et al. |
| 2007/0168625 A1 | 7/2007 | Cornwell et al. |
| 2007/0171714 A1 | 7/2007 | Wu et al. |
| 2007/0171730 A1 | 7/2007 | Ramamoorthy et al. |
| 2007/0180346 A1 | 8/2007 | Murin |
| 2007/0223277 A1 | 9/2007 | Tanaka et al. |
| 2007/0226582 A1 | 9/2007 | Tang et al. |
| 2007/0226592 A1 | 9/2007 | Radke |
| 2007/0228449 A1 | 10/2007 | Takano et al. |
| 2007/0253249 A1 | 11/2007 | Kang et al. |
| 2007/0253250 A1 | 11/2007 | Shibata |
| 2007/0263439 A1 | 11/2007 | Cornwell et al. |
| 2007/0266291 A1 | 11/2007 | Toda et al. |
| 2007/0271494 A1 | 11/2007 | Gorobets |
| 2007/0297226 A1 | 12/2007 | Mokhlesi |
| 2008/0010581 A1 | 1/2008 | Alrod et al. |
| 2008/0028014 A1 | 1/2008 | Hilt et al. |
| 2008/0049497 A1 | 2/2008 | Mo |
| 2008/0055989 A1 | 3/2008 | Lee |
| 2008/0082897 A1 | 4/2008 | Brandman et al. |
| 2008/0092026 A1 | 4/2008 | Brandman et al. |
| 2008/0104309 A1 | 5/2008 | Cheon et al. |
| 2008/0112238 A1 | 5/2008 | Kim |
| 2008/0116509 A1 | 5/2008 | Harari et al. |
| 2008/0126686 A1 | 5/2008 | Sokolov et al. |
| 2008/0127104 A1 | 5/2008 | Li |
| 2008/0128790 A1 | 6/2008 | Jung |
| 2008/0130341 A1 | 6/2008 | Shalvi et al. |
| 2008/0137413 A1 | 6/2008 | Kong et al. |
| 2008/0137414 A1 | 6/2008 | Park et al. |
| 2008/0141043 A1 | 6/2008 | Flynn et al. |
| 2008/0148115 A1 | 6/2008 | Sokolov |
| 2008/0158958 A1 | 7/2008 | Shalvi et al. |
| 2008/0159059 A1 | 7/2008 | Moyer |
| 2008/0162079 A1 | 7/2008 | Astigarraga et al. |
| 2008/0168216 A1 | 7/2008 | Lee |
| 2008/0168320 A1 | 7/2008 | Cassuto et al. |
| 2008/0181001 A1 | 7/2008 | Shalvi |
| 2008/0198650 A1 | 8/2008 | Shalvi et al. |
| 2008/0198652 A1 | 8/2008 | Shalvi et al. |
| 2008/0201620 A1 | 8/2008 | Gollub |
| 2008/0209114 A1 | 8/2008 | Chow et al. |
| 2008/0219050 A1 | 9/2008 | Shalvi et al. |
| 2008/0225599 A1 | 9/2008 | Chae |
| 2008/0250195 A1 | 10/2008 | Chow et al. |
| 2008/0263262 A1 | 10/2008 | Sokolov et al. |
| 2008/0282106 A1 | 11/2008 | Shalvi et al. |
| 2008/0285351 A1 | 11/2008 | Shlick et al. |
| 2008/0301532 A1 | 12/2008 | Uchikawa et al. |
| 2009/0024905 A1 | 1/2009 | Shalvi et al. |
| 2009/0043951 A1 | 2/2009 | Shalvi et al. |
| 2009/0046507 A1 | 2/2009 | Aritome |
| 2009/0072303 A9 | 3/2009 | Prall et al. |
| 2009/0091979 A1 | 4/2009 | Shalvi |
| 2009/0103358 A1 | 4/2009 | Sommer et al. |
| 2009/0106485 A1 | 4/2009 | Anholt |
| 2009/0113275 A1 | 4/2009 | Chen et al. |
| 2009/0125671 A1 | 5/2009 | Flynn |
| 2009/0132755 A1 | 5/2009 | Radke |
| 2009/0027961 A1 | 6/2009 | Park |
| 2009/0144598 A1 | 6/2009 | Yoon |
| 2009/0144600 A1 | 6/2009 | Perlmutter et al. |
| 2009/0150599 A1* | 6/2009 | Bennett .............. G06F 11/1441 711/103 |
| 2009/0150748 A1 | 6/2009 | Egner et al. |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0187803 A1 | 7/2009 | Anholt et al. |
| 2009/0199074 A1 | 8/2009 | Sommer |
| 2009/0213653 A1 | 8/2009 | Perlmutter et al. |
| 2009/0213654 A1 | 8/2009 | Perlmutter et al. |
| 2009/0228761 A1 | 9/2009 | Perlmutter et al. |
| 2009/0240872 A1 | 9/2009 | Perlmutter et al. |
| 2009/0282185 A1 | 11/2009 | Van Cauwenbergh |
| 2009/0282186 A1 | 11/2009 | Mokhlesi |
| 2009/0287930 A1 | 11/2009 | Nagaraja |
| 2009/0300269 A1 | 12/2009 | Radke et al. |
| 2009/0323942 A1 | 12/2009 | Sharon |
| 2010/0005270 A1 | 1/2010 | Jiang |
| 2010/0025811 A1 | 2/2010 | Bronner et al. |
| 2010/0030944 A1 | 2/2010 | Hinz |
| 2010/0058146 A1 | 3/2010 | Weingarten et al. |
| 2010/0064096 A1 | 3/2010 | Weingarten et al. |
| 2010/0088557 A1 | 4/2010 | Weingarten et al. |
| 2010/0091535 A1 | 4/2010 | Sommer et al. |
| 2010/0095186 A1 | 4/2010 | Weingarten |
| 2010/0110787 A1 | 5/2010 | Shalvi et al. |
| 2010/0115376 A1 | 5/2010 | Shalvi et al. |
| 2010/0122113 A1 | 5/2010 | Weingarten et al. |
| 2010/0124088 A1 | 5/2010 | Shalvi et al. |
| 2010/0131580 A1 | 5/2010 | Kanter et al. |
| 2010/0131806 A1 | 5/2010 | Weingarten et al. |
| 2010/0131809 A1 | 5/2010 | Katz |
| 2010/0131826 A1 | 5/2010 | Shalvi et al. |
| 2010/0131827 A1 | 5/2010 | Sokolov et al. |
| 2010/0131831 A1 | 5/2010 | Weingarten et al. |
| 2010/0146191 A1 | 6/2010 | Katz |
| 2010/0146192 A1 | 6/2010 | Weingarten et al. |
| 2010/0174853 A1 | 7/2010 | Lee |
| 2010/0180073 A1 | 7/2010 | Weingarten et al. |
| 2010/0172179 A1 | 8/2010 | Gorobets et al. |
| 2010/0199149 A1 | 8/2010 | Weingarten et al. |
| 2010/0211724 A1 | 8/2010 | Weingarten |
| 2010/0211833 A1 | 8/2010 | Weingarten |
| 2010/0211856 A1 | 8/2010 | Weingarten |
| 2010/0241793 A1 | 9/2010 | Sugimoto |
| 2010/0246265 A1 | 9/2010 | Moschiano et al. |
| 2010/0251066 A1 | 9/2010 | Radke |
| 2010/0253555 A1 | 10/2010 | Weingarten et al. |
| 2010/0257309 A1 | 10/2010 | Barsky et al. |
| 2010/0269008 A1 | 10/2010 | Leggette |
| 2010/0149881 A1 | 11/2010 | Lee et al. |
| 2010/0293321 A1 | 11/2010 | Weingarten |
| 2010/0318724 A1 | 12/2010 | Yeh |
| 2011/0051521 A1 | 3/2011 | Levy et al. |
| 2011/0055461 A1 | 3/2011 | Steiner et al. |
| 2011/0093650 A1 | 4/2011 | Kwon et al. |
| 2011/0096612 A1 | 4/2011 | Steiner et al. |
| 2011/0099460 A1 | 4/2011 | Dusija et al. |
| 2011/0119562 A1 | 5/2011 | Steiner et al. |
| 2011/0153919 A1 | 6/2011 | Sabbag |
| 2011/0161775 A1 | 6/2011 | Weingarten |
| 2011/0194353 A1 | 8/2011 | Hwang |
| 2011/0209028 A1 | 8/2011 | Post |
| 2011/0214029 A1 | 9/2011 | Steiner et al. |
| 2011/0214039 A1 | 9/2011 | Steiner et al. |
| 2011/0246792 A1 | 10/2011 | Weingarten |
| 2011/0246852 A1 | 10/2011 | Sabbag |
| 2011/0252187 A1 | 10/2011 | Segal et al. |
| 2011/0252188 A1 | 10/2011 | Weingarten |
| 2011/0271043 A1 | 11/2011 | Segal et al. |
| 2011/0302428 A1 | 12/2011 | Weingarten |
| 2012/0001778 A1 | 1/2012 | Steiner et al. |
| 2012/0005554 A1 | 1/2012 | Steiner et al. |

(56) References Cited

U.S. PATENT DOCUMENTS

| | | | |
|---|---|---|---|
| 2012/0005558 A1 | 1/2012 | Steiner et al. | |
| 2012/0005560 A1 | 1/2012 | Steiner et al. | |
| 2012/0008401 A1 | 1/2012 | Katz et al. | |
| 2012/0008414 A1 | 1/2012 | Katz et al. | |
| 2012/0017136 A1 | 1/2012 | Ordentlich et al. | |
| 2012/0051144 A1 | 3/2012 | Weingarten et al. | |
| 2012/0063227 A1 | 3/2012 | Weingarten et al. | |
| 2012/0066441 A1 | 3/2012 | Weingarten | |
| 2012/0110250 A1 | 5/2012 | Sabbag et al. | |
| 2012/0124273 A1 | 5/2012 | Goss et al. | |
| 2012/0210041 A1* | 8/2012 | Flynn | G06F 1/183 711/3 |
| 2012/0246391 A1 | 9/2012 | Meir | |
| 2014/0195725 A1* | 7/2014 | Bennett | G06F 12/0246 711/103 |

OTHER PUBLICATIONS

Search Report of PCT Patent Application WO 2009/095902 A3, dated Mar. 4, 2010.
Search Report of PCT Patent Application WO 2009/078006 A3, dated Mar. 4, 2010.
Search Report of PCT Patent Application WO 2009/074979 A3, dated Mar. 4, 2010.
Search Report of PCT Patent Application WO 2009/074978 A3, dated Mar. 4, 2010.
Search Report of PCT Patent Application WO 2009/072105 A3, dated Mar. 4, 2010.
Search Report of PCT Patent Application WO 2009/072104 A3, dated Mar. 4, 2010.
Search Report of PCT Patent Application WO 2009/072103 A3, dated Mar. 4, 2010.
Search Report of PCT Patent Application WO 2009/072102 A3, dated Mar. 4, 2010.
Search Report of PCT Patent Application WO 2009/072101 A3, dated Mar. 4, 2010.
Search Report of PCT Patent Application WO 2009/072100 A3, dated Mar. 4, 2010.
Search Report of PCT Patent Application WO 2009/053963 A3, dated Mar. 4, 2010.
Search Report of PCT Patent Application WO 2009/053962 A3, dated Mar. 4, 2010.
Search Report of PCT Patent Application WO 2009/053961 A3, dated Mar. 4, 2010.
Search Report of PCT Patent Application WO 2009/037697 A3, dated Mar. 4, 2010.
Yani Chen, Kcshab K. Parhi, "Small Area Parallel Chien Search Architectures for Long BCH Codes", Ieee Transactions on Very Large Scale Integration(VLSI) Systems, vol. 12, No. 5, May 2004.
Yuejian Wu, "Low Power Decoding of BCH Codes", Nortel Networks, Ottawa, Ont., Canada, in Circuits and systems, 2004. ISCAS '04. Proceeding of the 2004 International Symposium on Circuits and Systems, published May 23-26, 2004, vol. 2, pp. II-369-II-372 vol. 2.
Michael Purser, "Introduction to Error Correcting Codes", Artech House Inc., 1995.
Ron M. Roth, "Introduction to Coding Theory", Cambridge University Press, 2006.
Akash Kumar, Sergei Sawitzki, "High-Throughput and Low Power Architectures for Reed Solomon Decoder", (a.kumar at tue.nl, Eindhoven University of Technology and sergei.sawitzki at philips.com), Oct. 2005.
Todd K.Moon, "Error Correction Coding Mathematical Methods and Algorithms", A John Wiley & Sons, Inc., 2005.
Richard E. Blahut, "Algebraic Codes for Data Transmission", Cambridge University Press, 2003.
David Esseni, Bruno Ricco, "Trading-Off Programming Speed and Current Absorption in Flash Memories with the Ramped-Gate Programming Technique", Ieee Transactions on Electron Devices, vol. 47, No. 4, Apr. 2000.
Giovanni Campardo, Rino Micheloni, David Novosel, "VLSI-Design of Non-Volatile Memories", Springer Berlin Heidelberg New York, 2005.
John G. Proakis, "Digital Communications", 3rd ed., New York: McGraw-Hill, 1995.
J.M. Portal, H. Aziza, D. Nee, "EEPROM Memory: Threshold Voltage Built in Self Diagnosis", ITC International Test Conference, Paper 2.1, Feb. 2005.
J.M. Portal, H. Aziza, D. Nee, "Eeprom Diagnosis Based on Threshold Voltage Embedded Measurement", Journal of Electronic Testing: Theory and Applications 21, 33-42, 2005.
G. Tao, A. Scarpa, J. Dijkstra, W. Stidl, F. Kuper, "Data retention prediction for modern floating gate non-volatile memories", Microelectronics Reliability 40 (2000), 1561-1566.
T. Hirncno, N. Matsukawa, H. Hazama, K. Sakui, M. Oshikiri, K. Masuda, K. Kanda, Y. Itoh, J. Miyamoto, "A New Technique for Measuring Threshold Voltage Distribution in Flash EEPROM Devices", Proc. IEEE 1995 Int. Conference on Microelectronics Test Structures, vol. 8, Mar. 1995.
Boaz Eitan, Guy Cohen, Assaf Shappir, Eli Lusky, Amichai Givant, Meir Janai, Ilan Bloom, Yan Polansky, Oleg Dadashev, Avi Lavan, Ran Sahar, Eduardo Maayan, "4-bit per Cell NROM Reliability", Appears on the website of Saifun.com, 2005.
Paulo Cappelletti, Clara Golla, Piero Olivo, Enrico Zanoni, "Flash Memories", Kluwer Academic Publishers, 1999.
JEDEC Standard, "Stress-Test-Driven Qualification of Integrated Circuits", JEDEC Solid State Technology Association. JEDEC Standard No. 47F pp. 1-26, Dec. 2007.
Dempster, et al., "Maximum Likelihood from Incomplete Data via the EM Algorithm", Journal of the Royal Statistical Society. Series B (Methodological), vol. 39, No. 1 (1997), pp. 1-38.
Mielke, et al., "Flash EEPROM Threshold Instabilities due to Charge Trapping During Program/Erase Cycling", IEEE Transactions on Device and Materials Reliability, vol. 4, No. 3, Sep. 2004, pp. 335-344.
Daneshbeh, "Bit Serial Systolic Architectures for Multiplicative Inversion and Division over GF (2)", A thesis presented to the University of Waterloo, Ontario, Canada, 2005, pp. 1-118.
Chen, Formulas for the solutions of Quadratic Equations over GF (2), IEEE Trans. Inform. Theory, vol. IT-28, No. 5, Sep. 1982, pp. 792-794.
Berlekamp et al., "On the Solution of Algebraic Equations over Finite Fields", Inform. Cont. 10, Oct. 1967, pp. 553-564.

\* cited by examiner

PROGRAMMING AN EMBEDDED FLASH STORAGE DEVICE

BACKGROUND OF THE INVENTION

An embedded flash storage device (such as an embedded flash storage device) is a flash storage device that is embedded in a computerized system that also includes a host computer and a flash memory controller. The embedded flash storage device may be activated only under the permission of the host computer.

Data units can be read from the embedded flash storage device during read transactions and can be written (programmed) to the embedded flash storage device during write transactions.

The read and write processes utilize one or more memory management tables that may map logical addresses of data units to physical addresses of flash memory cells that store the data units.

The embedded flash storage device are subjected to power failures but are expected to maintain the integrity of data units that were written during successfully completed write transactions despite such power failures.

In order to maintain this integrity a successfully completed write transaction should include the programming of (a) data unit, and of (b) one or more memory management tables that are updated to reflect the programming of the data unit.

The throughput of an embedded flash storage device is inversely proportional to the latency of a transaction.

Referring to a write transaction latency—this latency is defined by a period required to successfully complete a write transaction—including a programming of one or more data units and a programming updated memory management tables (after updating the memory management tables).

FIG. 1 illustrates a prior art timing diagram 10 and FIG. 2 illustrates a prior art method 20.

The method 20 includes the following sequence of stages starting (21) by a flash memory controller, a write transaction; programming (22), by the embedded flash storage device, a data unit to a flash memory unit of the embedded flash storage device; updating (23) by the flash memory controller, the memory management tables to reflect the programming of the data unit; programming (24) by the embedded flash storage device, the memory management tables (after being updated) to the flash memory unit; sending (25) to the host computer an acknowledgement of a successful completion of the write transaction—after a successful completion of stages 21-24; sending (26) the write transaction.

It is noted that stages 22 and 24 are relatively long in relation to other stages of method 20.

Timing diagram 10 illustrates the sequence of signals and stages a write transaction initialization signal 11 from the host computer to the flash memory controller. This starts a write transaction of duration 12; initial operations (13) executed by the flash memory controller before the programming of a data unit. This may include determining where to write the data unit, error correction encoding the data unit and the like; programming (14) by the embedded flash storage device, a data unit to the flash memory unit of the embedded flash storage device; intermediate operations (15) executed by the flash memory controller before programming the memory management tables—such as updating the memory management tables; programming (16) the memory management tables to the flash memory unit; final operations (17) executed by the flash memory controller. For example—checking the status of a program; sending (18) an acknowledgment to the host computer and thereby ending the transaction.

As illustrated above—the host computer can be notified that the write transaction succeeded only after the (entire) write transaction succeeded and thus the latency of write transaction is relatively high and the throughput of the embedded flash is low.

There is a need to provide a low latency and power failure tolerant method for programming data units to an embedded flash storage device.

SUMMARY

According to an embodiment of the invention a method may be provided and may include sending, by a flash memory controller, to an embedded flash storage device and during a transaction, a data unit and recovery metadata; wherein the recovery metadata differs from a flash memory unit memory management data structure; instructing the embedded flash storage device to program the data unit and the recovery metadata to a group of flash memory cells of a flash memory unit of the embedded flash storage device; sending, by the flash memory controller, to the host computer a transaction completion indication in response to a successful completion of the programming and before a completion of a management process that may include updating by the flash memory controller, the flash memory unit management data structure to reflect (a) the recovery metadata and (b) physical address information related to the group of the flash memory cells; and programming, by the embedded flash storage device, the flash memory management data structure to the flash memory unit; wherein the flash memory management data structure is reconstructible based upon the recovery metadata and the physical address information related to the group of the flash memory cells.

The method may include attempting by the embedded flash storage device to complete the management process.

The management process is assigned a lower priority than programming data units to the flash memory unit.

The method may include reconstructing, by the flash memory controller, the flash memory management data structure based upon the recovery metadata and the physical address information related to the group of the flash memory cells if the management process failed to be successfully completed. The failure may be contributed to a sudden power drop.

The method may include determining, by the flash memory controller, whether the management process failed by comparing (a) a content of a flash memory management data structure stored in the flash memory unit and (b) a combination of (i) the recovery metadata and (ii) the physical address information related to the group of the flash memory cells.

The method may include determining, by the flash memory controller, whether the management process failed by comparing (a) a first mapping between a logical address and a physical address of the data unit as reflected by a flash memory management data structure stored in the flash memory unit and (b) a second mapping between the logical address and the physical address of the data unit as reflected by the recovery metadata and the physical address information related to the group of the flash memory cells.

The method may include updating the flash memory unit management data structure in parallel to a programming of the data unit and the recovery metadata by the embedded flash storage device.

The method may include receiving multiple data units and performing multiple updates of the flash memory management data structure, each update related to a different data unit of the multiple data units to provide the flash memory management data structure before programming the flash memory management data structure to the flash memory unit.

The recovery metadata may represent a logical address of the data unit.

According to an embodiment of the invention there may be provided a non-transitory computer readable medium that includes instructions to be executed by a computerized system and may store instructions for sending to an embedded flash storage device and during a transaction, a data unit and recovery metadata; wherein the recovery metadata differs from a flash memory unit memory management data structure; instructing the embedded flash storage device to program the data unit and the recovery metadata to a group of flash memory cells of a flash memory unit of the embedded flash storage device; sending to the host computer a transaction completion indication in response to a successful completion of the programming and before a completion of a management process that may include updating the flash memory unit management data structure to reflect (a) the recovery metadata and (b) physical address information related to the group of the flash memory cells; and programming, by the embedded flash storage device, the flash memory management data structure to the flash memory unit; wherein the flash memory management data structure is reconstructible based upon the recovery metadata and the physical address information related to the group of the flash memory cells.

The non-transitory computer readable medium may store instructions for attempting by the embedded flash storage device to complete the management process.

The management process is assigned a lower priority than programming data units to the flash memory unit.

The non-transitory computer readable medium may store instructions for reconstructing, by the flash memory controller, the flash memory management data structure based upon the recovery metadata and the physical address information related to the group of the flash memory cells if the management process failed to be successfully completed.

The non-transitory computer readable medium may store instructions for determining, by the flash memory controller, whether the management process failed by comparing (a) a content of a flash memory management data structure stored in the flash memory unit and (b) a combination of (i) the recovery metadata and (ii) the physical address information related to the group of the flash memory cells.

The non-transitory computer readable medium may store instructions for determining, by the flash memory controller, whether the management process failed by comparing (a) a first mapping between a logical address and a physical address of the data unit as reflected by a flash memory management data structure stored in the flash memory unit and (b) a second mapping between the logical address and the physical address of the data unit as reflected by the recovery metadata and the physical address information related to the group of the flash memory cells.

The non-transitory computer readable medium may store instructions for updating the flash memory unit management data structure in parallel to a programming of the data unit and the recovery metadata by the embedded flash storage device.

The non-transitory computer readable medium may store instructions for receiving multiple data units and performing multiple updates of the flash memory management data structure, each update related to a different data unit of the multiple data units to provide the flash memory management data structure before programming the flash memory management data structure to the flash memory unit.

The recovery metadata represents a logical address of the data unit.

According to an embodiment of the invention there may be provided a flash memory controller, may include a write circuit that is arranged to send to embedded flash storage device and during a transaction, a data unit and recovery metadata; wherein the recovery metadata differs from a flash memory unit memory management data structure; instruct the embedded flash storage device to program the data unit and the recovery metadata to a group of flash memory cells of a flash memory unit of the embedded flash storage device; and an interface that is arranged to send to a host computer a transaction completion indication in response to a successful completion of the programming and before a completion of management process that may include updating the flash memory unit management data structure to reflect (a) the recovery metadata and (b) physical address information related to the group of the flash memory cells; and programming, by the embedded flash storage device, the flash memory management data structure to the flash memory unit; wherein the flash memory management data structure is reconstructible based upon the recovery metadata and the physical address information related to the group of the flash memory cells.

The flash memory controller may include a random access memory for storing the flash memory management data structure.

The flash memory controller may be arranged to attempt to complete the management process.

The management process may be assigned a lower priority than programming data units to the flash memory unit.

The flash memory controller may be arranged to reconstruct the flash memory management data structure based upon the recovery metadata and the physical address information related to the group of the flash memory cells if the management process failed to be successfully completed. The failure may be contributed to a sudden power drop.

The flash memory controller may be arranged to determine whether the management process failed by comparing (a) a content of a flash memory management data structure stored in the flash memory unit and (b) a combination of (i) the recovery metadata and (ii) the physical address information related to the group of the flash memory cells.

The flash memory controller may be arranged to determine whether the management process failed by comparing (a) a first mapping between a logical address and a physical address of the data unit as reflected by a flash memory management data structure stored in the flash memory unit and (b) a second mapping between the logical address and the physical address of the data unit as reflected by the recovery metadata and the physical address information related to the group of the flash memory cells.

The flash memory controller may be arranged to update the flash memory unit management data structure in parallel to a programming of the data unit and the recovery metadata by the embedded flash storage device.

The flash memory controller may be arranged to receive multiple data units and performing multiple updates of the flash memory management data structure, each update related to a different data unit of the multiple data units to provide the flash memory management data structure before programming the flash memory management data structure to the flash memory unit.

The recovery metadata may represent a logical address of the data unit.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
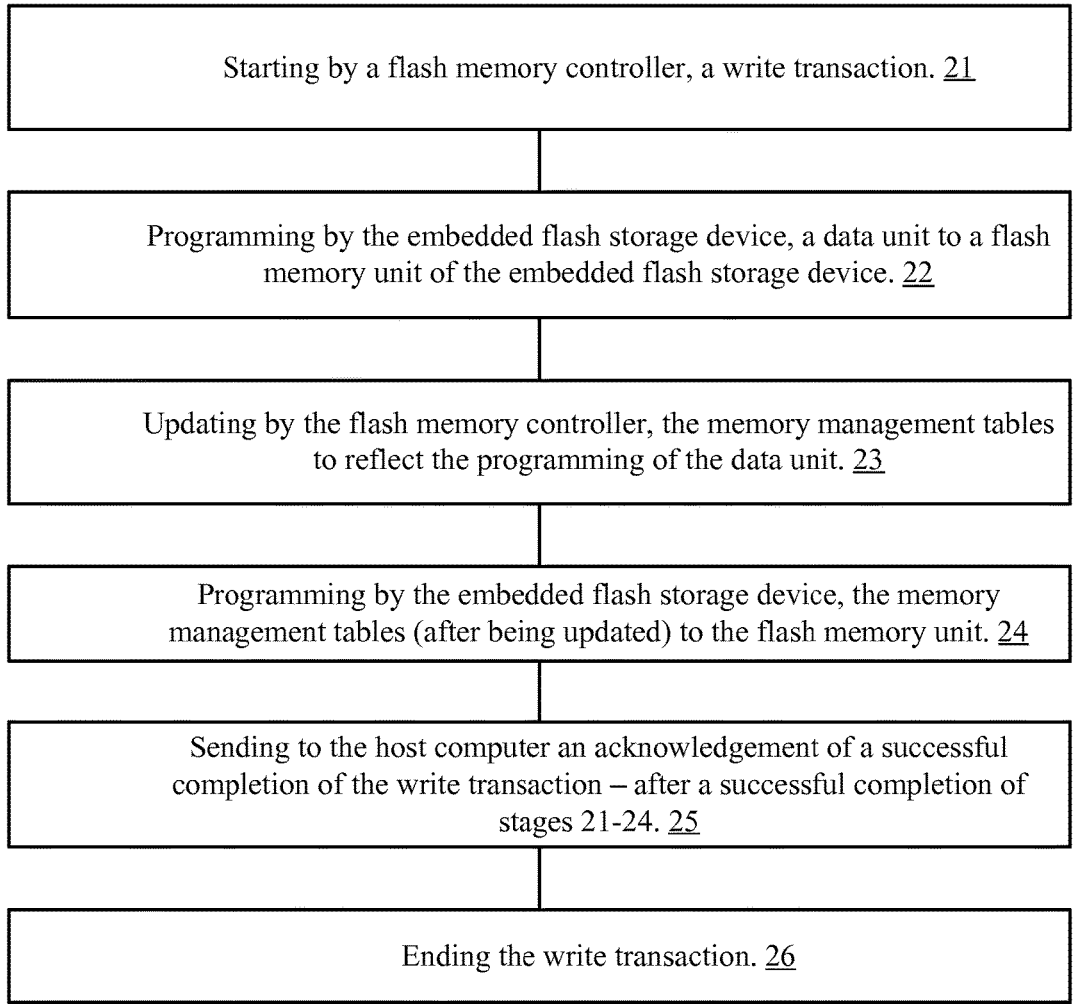
FIG. 1 illustrates a prior art method.
Figure 2:
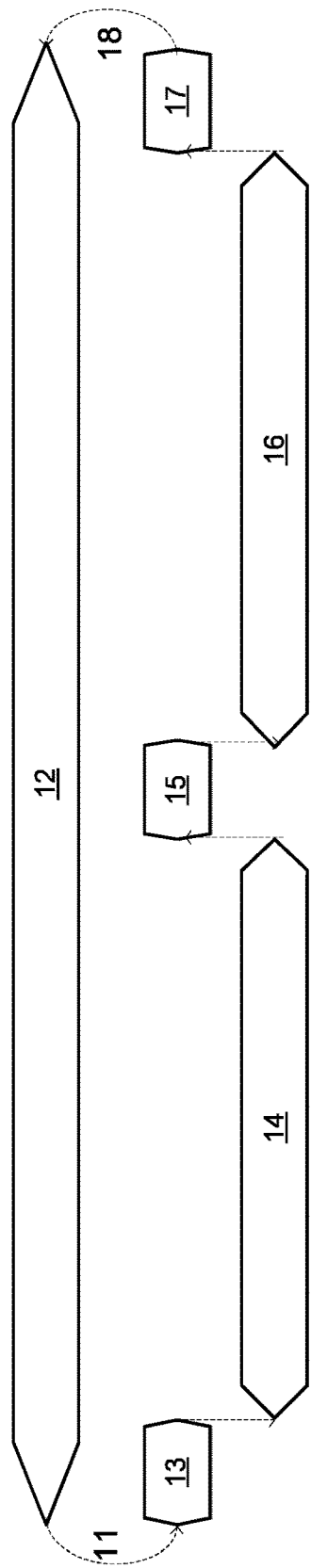
FIG. 2 illustrates a prior art timing diagram.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium may store instructions that once executed by a computer result in the execution of the method.

Any reference in the specification to a system should be applied mutatis mutandis to a method that may be executed by the system and should be applied mutatis mutandis to a non-transitory computer readable medium may store instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The term "data unit" may refer to multiple bits that convey information of any type and of any size. The data unit can be a byte, a word, a page, a block, a logical access unit and the like.

It is noted that programming of the flash memory unit management data structure can include programming the entire flash memory unit management data structure, programming portions of the flash memory unit management data structure and even programming only updates to the flash memory unit management data structure. Accordingly—any reference to each of these programming options should be applied mutatis mutandis to any other of these programming options.

Figure 3:
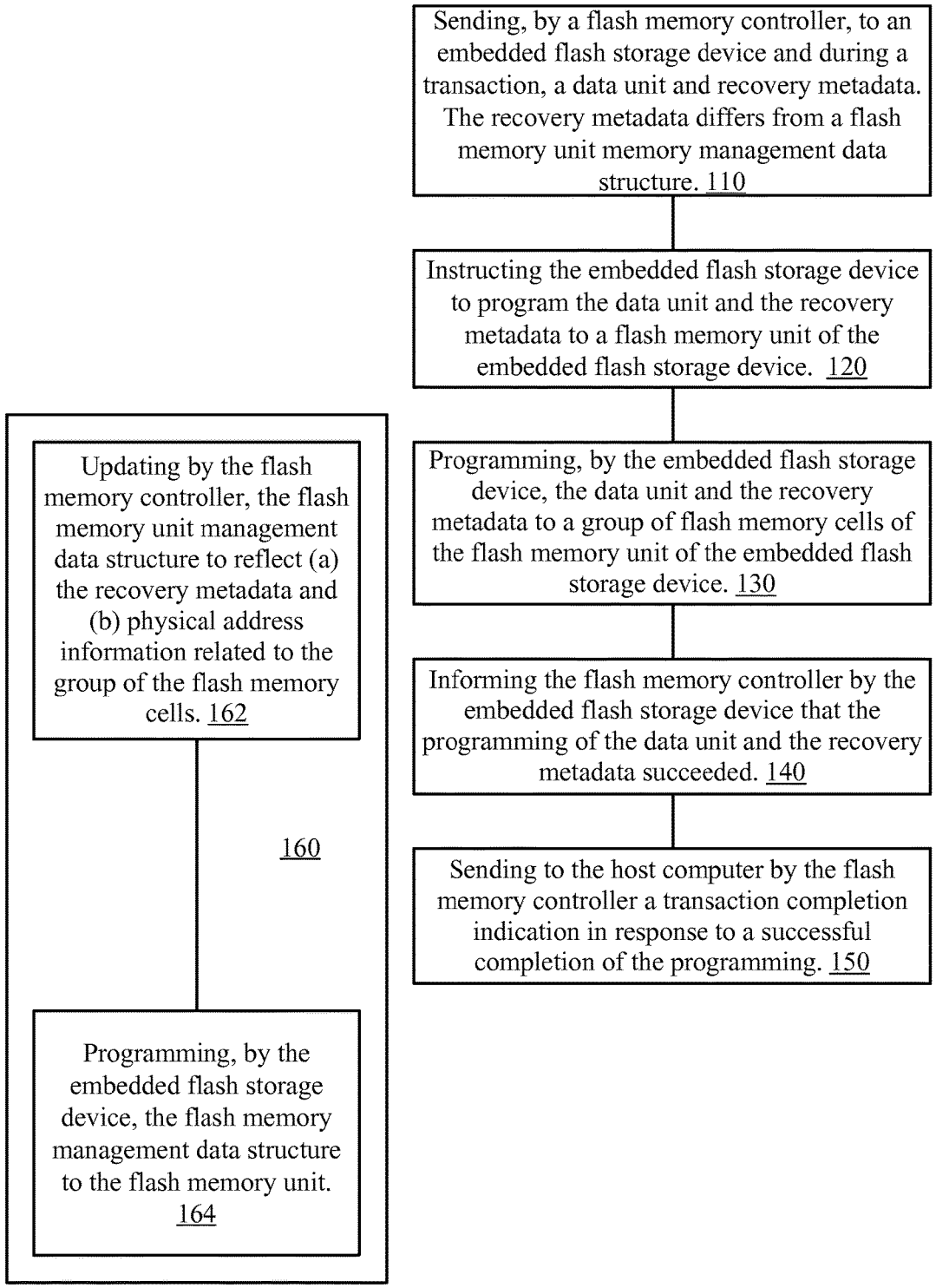
FIG. 3 illustrates a method according to an embodiment of the invention.

FIG. 3 illustrates a method 100 according to an embodiment of the invention.

Method 100 may start by stage 110 of sending a data unit and recovery metadata, by a flash memory controller, to an embedded flash storage device and during a transaction.

The recovery metadata differs from a flash memory unit memory management data structure. It is usually much smaller than the flash memory unit memory management metadata. It may, for example, describe the logical address of the data unit and may not include information about the physical address of the data unit.

Stage 110 may be triggered by a reception by a flash memory controller of an instruction sent from the host computer—instructing the flash memory controller to initiate a write transaction or otherwise by an indication from the host computer that allows the flash memory controller to initiate a transaction.

The recovery metadata may be included at a spare area allocated for storing, for example, redundancy information. The recovery metadata may be included instead of redundancy bits. The recovery metadata may be much smaller than the data unit—for example 8 bytes of recovery metadata for 500 bytes of data unit. Other sizes and relationships between sizes of data unit and recovery metadata can be provided.

Stage 110 may be followed by stage 120 of instructing an embedded flash storage device to program the data unit and the recovery metadata to a flash memory unit of the embedded flash storage device.

Then data unit and the recovery metadata should be programmed to a group of flash memory cells of the flash memory unit. The group of flash memory cells may include a consecutive group of flash memory cells, a non-consecutive group of flash memory cells and the like.

Stage 120 may be followed by stage 130 of programming, by the embedded flash storage device, the data unit, and the recovery metadata to the group of flash memory cells of the flash memory unit.

The data unit and the recovery metadata may be written to a predefined location—or within a predefined memory region. The content (or at least a portion of the content) of the predefined location can be read during a power up process in order to allow to retrieve the recovery metadata upon power up.

The data units and recovery metadata may be written in a sequential manner in order to assist in determining the order of writing.

Alternatively, the data units and the recovery metadata may be written in a non-sequential manner but may include time stamps or any other indication about the order of programming. The order of programming can be useful, for example, when the flash memory management data structure also has a time stamp—which can assist in determining which data units were written after the last update of the flash memory management data structure.

According to other embodiments of the invention—the flash memory management data structure may store pointers to data units, such as a pointer to a last data unit that was used to update that flash memory management data structure.

Stage 130 may be followed (if successfully completed) by stage 140 of informing the flash memory controller by the embedded flash storage device that the programming of the data unit and the recovery metadata succeeded.

Stage 140 may be followed by stage 150 of sending to the host computer (by the flash memory controller) a transaction completion indication in response to a successful completion of the programming. At this point the host computer can be released from monitoring after the programming.

Method 100 also includes a management process 160. The management process 160 may start after either one of stages 120, 130, 140 and 150. The management process 160 is completed after the completion of stage 150.

The management process 160 may include stage 162 of updating by the flash memory controller, the flash memory unit management data structure to reflect (a) the recovery metadata and (b) physical address information related to the group of the flash memory cells; stage 164 of programming, by the embedded flash storage device, the flash memory management data structure to the flash memory unit. The flash memory management data structure can be reconstructed (is reconstructible) based upon the recovery metadata and the physical address information related to the group of the flash memory cells.

According to an embodiment of the invention the management process can be assigned a lower priority than programming data units to the flash memory unit. It can be executed as a background process.

Stage 164 may be executed, for example, in parallel to stages that do not require access to the flash memory unit. It may occur during a reception of data units from the host, while another flash memory die of the flash memory unit is programmed, and the like. For example—a write command can cause more than a single page program. Once a first page data received and program started, following data is being received on Host interface. In parallel controller can perform other non-flash operations. Alternatively or additionally, if there are multiple NANAD flash dies then different NAND operations can be done on different dies in parallel.

Method 100 may be repeated for each data unit. Alternatively, the method can include accumulating updates and programming only an accumulation of updates.

Thus—the programming of the flash memory management data structure (stage 164) can be executed once for each multiple data units (once for multiple updates)—thereby making the programming of the flash memory management data structure more efficient. Stage 164 may include counting whether the number of updates (the number of data units) received from the last programming reaches a threshold or not. If reaches-then programming.

The number of accumulated updates can provide a trade-off between programming efficiency (higher number) and reduction of reconstruction operations (lower number). This number can also be dictated or at least be limited by the allowable duration of a single programming iteration of the embedded flash storage device.

The size (number) of the accumulation may be limited by several factors; prior prepared Flash portion is limited and thus once reaching its fullness may cause boundary on flash memory management data structure updates accumulation. In order to have easy recovery process there may be provided a certain area for future incoming data. This area will be the only search location during recovery process instead of searching entire disk. This area is limited, thus once full, there is a need to allocate new one. In such case, all updates and full recovery information should be stored before going to new area; power up process (that includes the recovery process) time limitation may restrict the amount of unmapped data units (data units not mapped by the flash memory management data structure) that can be processed during power up time; power up process duration may be limited by system requirements; in addition to a possible limitation on the overall duration of the power up process—it should be noted that only a part of the power up process can be allocated to the recovery process. Rest of the time is used for other boot and maintenance operations; the reading of data units and recovery metadata has some latency. Metadata extraction and processing has latency. These latencies should also be taken into account; the recovery time of the flash memory management data structure divided by an effective recovery metadata extraction time can provide an upper limit on amount of accumulation; the flash memory management data structure updates are stored in a non-volatile memory and the non-volatile memory limitations (such as size, read latency) may limit the number of accumulations.

According to an embodiment of the invention the updates to the flash memory management data structure can be accumulated while transactions are incoming. These updates may be programmed only between transactions but this is not necessarily so.

As transactions behavior may be bursty, characterized by transactions bursts and idle periods alternatively—delaying the programming of the updates can allow the system to use the idle periods and eliminate impact on real time transactions.

According to an embodiment of the invention the host computer can control the idle times and the timing of execution of the programming of updates.

According to an embodiment of the invention flash memory management data structure updates are programmed using multiple (even all) flash memory dies of the embedded flash storage device in order to increase throughput and reduce latency.

Alternatively, the flash memory management data structure programming can be made to flash memory dies of the embedded flash storage device that are not used for programming data units and metadata.

Figure 4:
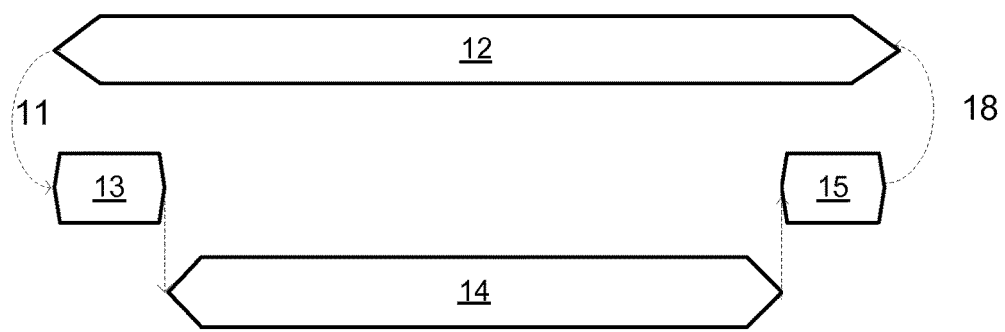
FIG. 4 illustrates a timing diagram according to an embodiment of the invention.

FIG. 4 illustrates a timing diagram 200 according to an embodiment of the invention.

Timing diagram 200 illustrates the sequence of signals and stages a write transaction initialization signal 11 from the host computer to the flash memory controller. This starts a write transaction of duration 212; initial operations (213) executed by the flash memory controller before the programming of a data unit. This may include generating or receiving recovery metadata, determining where to write the data unit, error correction encoding the data unit and the like; programming (214) by the embedded flash storage device, a data unit and data unit reconstruction metadata to the flash memory unit of the embedded flash storage device; intermediate operations (215) executed by the flash memory controller before programming the memory management tables; sending (218) an acknowledgment to the host computer and thereby ending the transaction.

Figure 5:
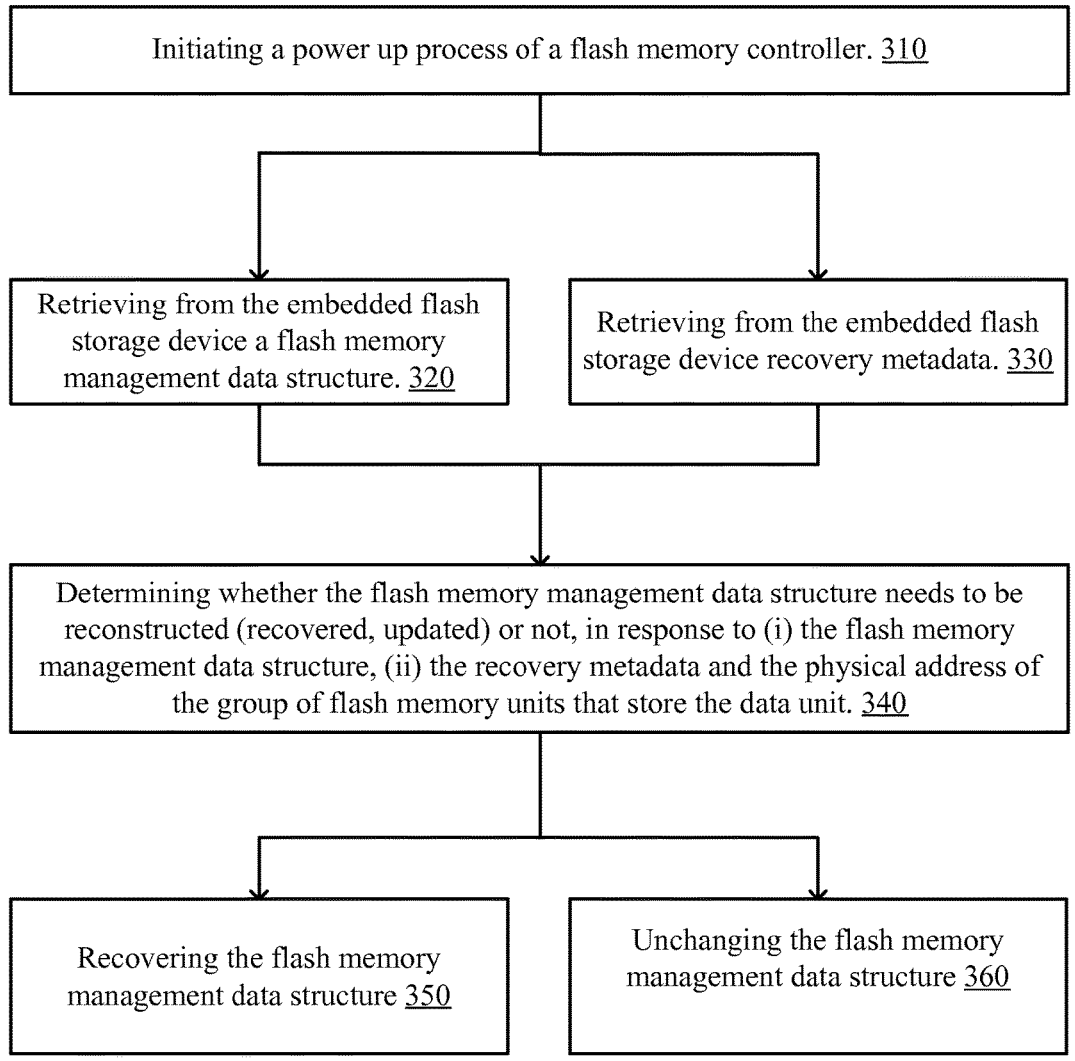
FIG. 5 illustrates a method according to an embodiment of the invention.

FIG. 5 illustrates a method 300 according to an embodiment of the invention.

Method 300 starts by stage 310 of initiating a power up process of a flash memory controller.

Stage 310 may be followed by stages 320 and 330.

Stage 320 includes retrieving from the embedded flash storage device a flash memory management data structure.

Stage 330 includes retrieving from the embedded flash storage device recovery metadata.

It is assumed that the data unit and the recovery metadata are stored in a known (physical) address range so that the physical address of the group of flash memory units that store the data unit is either known in advance (before reading the data unit) known or can be obtained when reading the data unit from the known physical address range.

Stages 320 and 330 are followed by stage 340 of determining whether the flash memory management data structure needs to be reconstructed (updated) or not, in response to (i) the flash memory management data structure (stage 320), (ii) the recovery metadata (stage 330) and the physical address of the group of flash memory units that store the data unit.

Stage 340 may include comparing (a) a first mapping between a logical address and a physical address of the data unit as reflected by the flash memory management data structure and (b) a second mapping between the logical address and the physical address of the data unit as reflected by the recovery metadata and the physical address information related to the group of the flash memory cells.

Stage 340 may be followed by stage 350 of reconstructing the flash memory management data structure if it is determined that it needs to be reconstructed.

Stage 340 may be followed by stage 360 of unchanging the flash memory management data structure if it is determined that it does should not be reconstructed.

If, for example, the data unit does not appear in the flash memory management data structure then the flash memory management data structure should be updated (stage 350) to reflect the programming of the data unit to the flash memory unit.

If, for example, the data unit appears in the flash memory management data structure but the first mapping differs from the second mapping then the flash memory management data structure should be updated (stage 350) to reflect the second mapping and not the first mapping.

Figure 6:
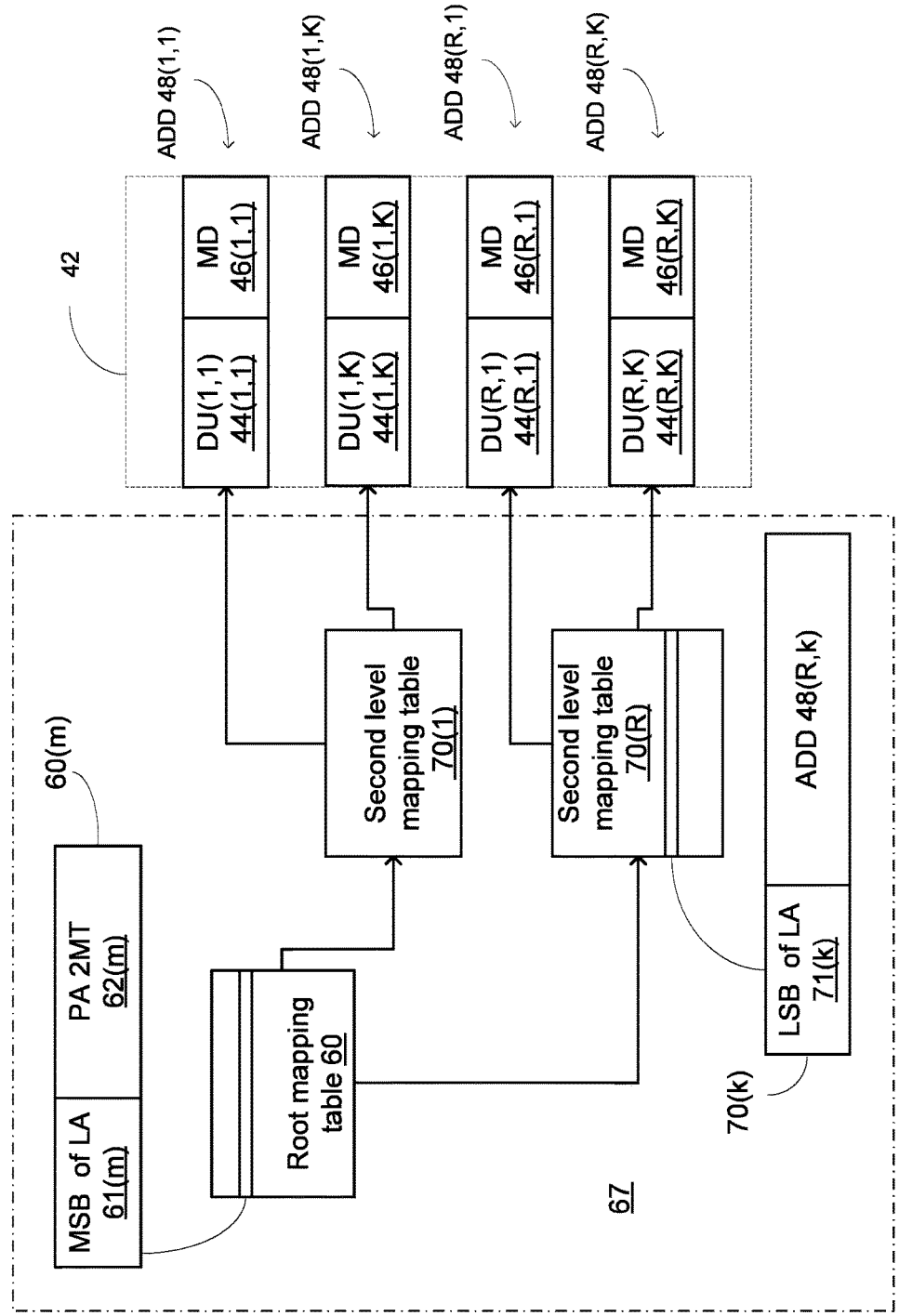
FIG. 6 illustrates recovery metadata, a flash memory unit memory management data structure and physical address information according to an embodiment of the invention.
Figure 7:
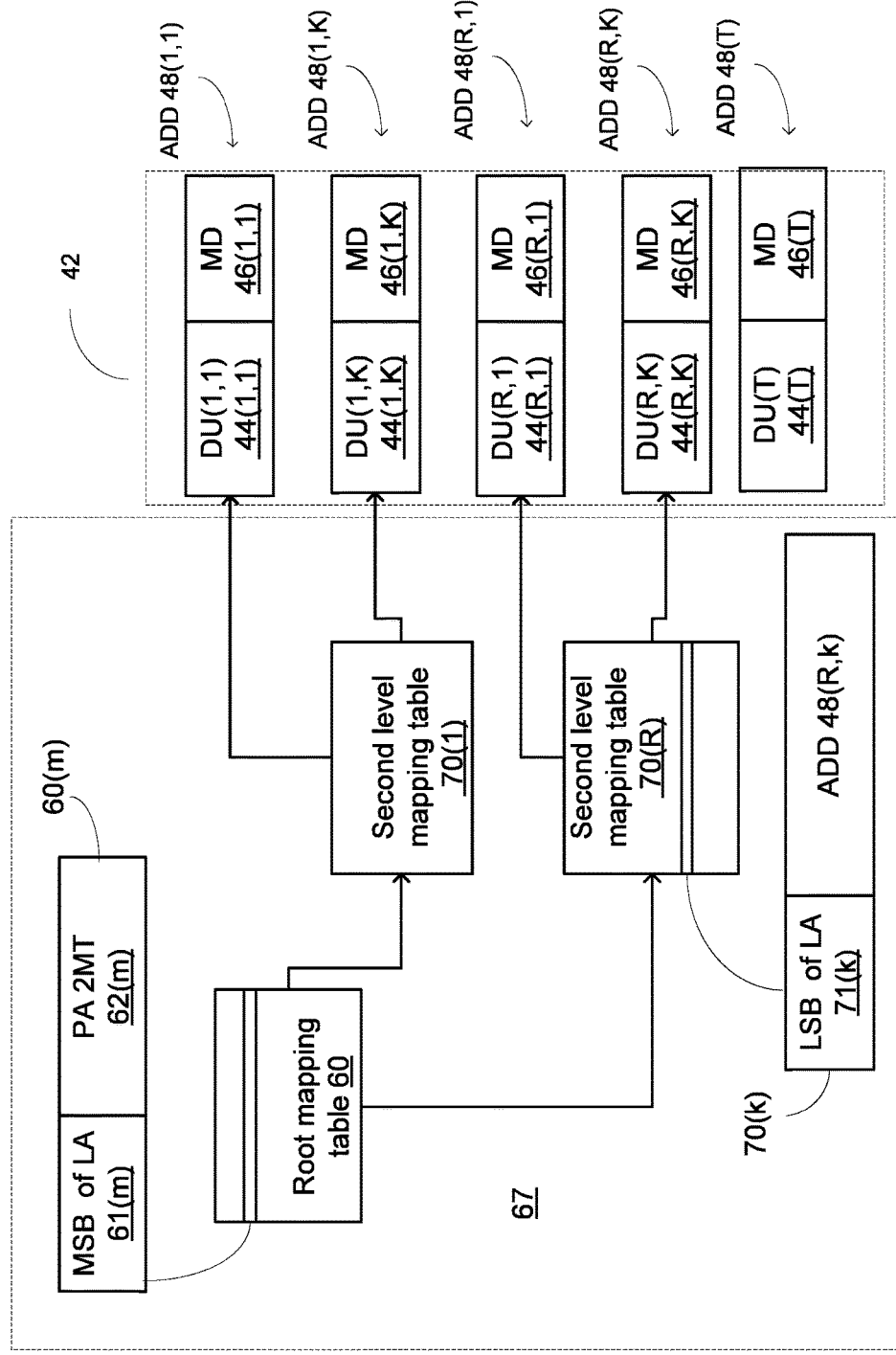
FIG. 7 illustrates recovery metadata, a flash memory unit memory management data structure and physical address information according to an embodiment of the invention.
Figure 8:
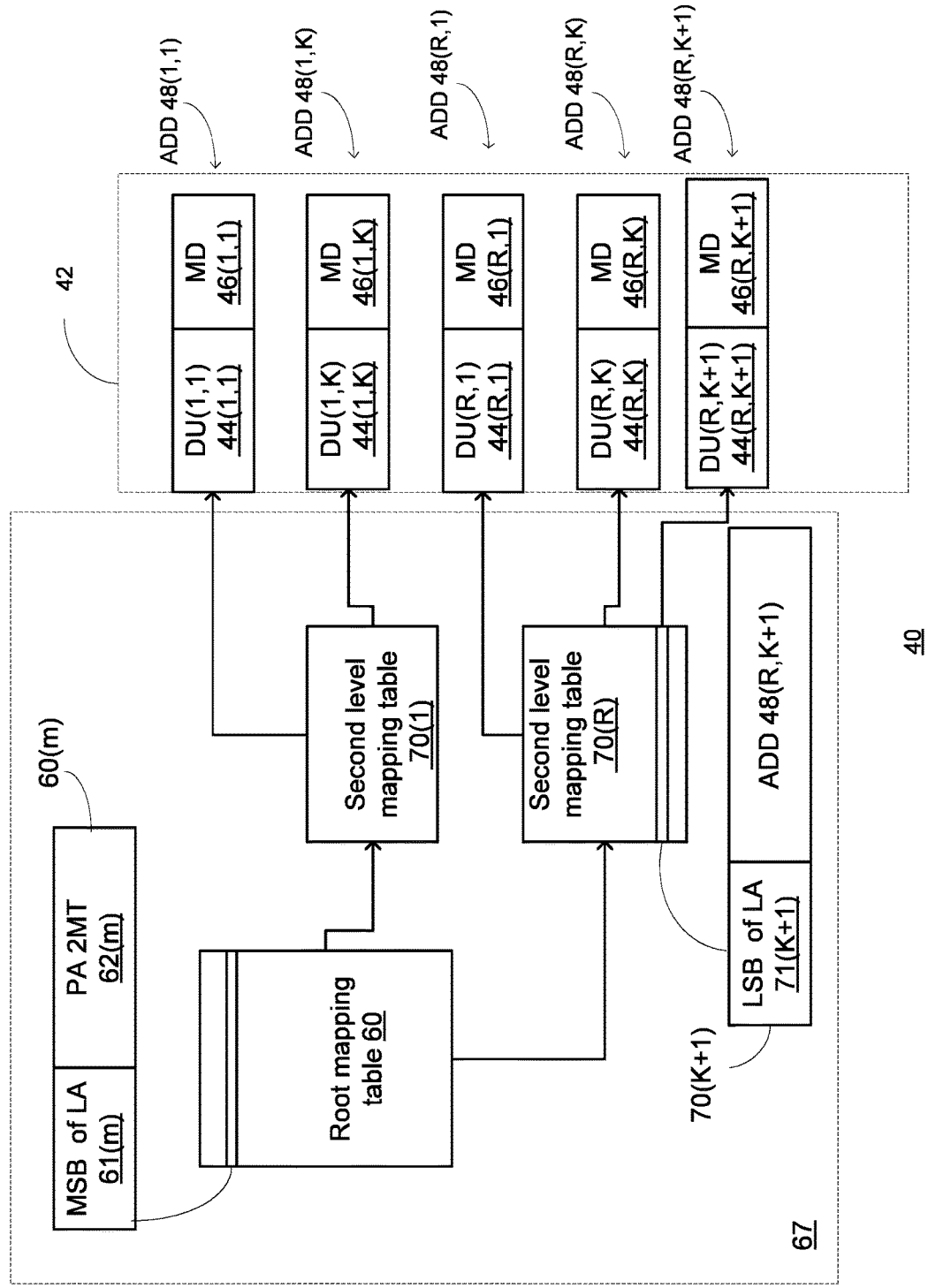
FIG. 8 illustrates recovery metadata, a flash memory unit memory management data structure and physical address information according to an embodiment of the invention.

FIG. 6-8 illustrate recovery metadata MD 46(1,1)-46(1,K), 46(R,1)-46(R,K), a flash memory unit memory management data structure 67 and physical address information ADD MD 46(1,1)-48(1,K), 48(R,1)-48(R,K) according to various embodiments of the invention.

Flash memory unit memory management data structure 67 provides a mapping between a logical address (LA) of a data unit and a physical address of the data unit (ADD 48(r,k)).

Flash memory unit memory management data structure 67 is illustrated as including a root mapping table 60 and multiple (R) second level mapping tables 70(1)-70(R).

The root mapping table 60 stores pointers to second level mapping tables 70(1)-70(R). The second level mapping tables 70(1)-70(R) stores pointers to the physical addresses of the data units—to the groups of flash memory cells that store the data units.

Each second level mapping table can store K or more pointers to K or more data units. The root mapping table can store R or more pointer to R or more second level mapping tables.

Second level mapping table 70(1) stores indexes to data units DU 44(1,1)-44(1,K), wherein each data unit is appended with recovery metadata MD 46(1,1)-46(1,K). Second level mapping table 70(R) stores indexes to data units DU 44(R,1)-44(R,K), wherein each data unit is appended with recovery metadata MD 46(R,1)-46(R,K).

This arrangement supports a two stage mapping— a. The most significant part (MSB) of the LA is used as an index to an entry of the root mapping table—which entry points to a physical address of a selected second level mapping table 70(r). Entry 60(m) includes a mapping between the most significant part of the logical address "MSB of LA" 61(m) and the physical address of a selected second level mapping table "PA of 2MT" 62(m). The number of entries of the root mapping table can be the number of maximal different logical addresses to be assigned to the data units.

b. The least significant part (LSB) of the LA is used as an index to an entry of the selected second level mapping table 70(k) may store the pointer to the physical address of the data unit itself. Entry 70(k) includes a mapping between the least significant part of the logical address "LSB of LA" 71(K) and the physical address of the data unit ADD 48(R,k).

In FIG. 7 all the data units are properly mapped in the flash memory unit memory management data structure 67. If a power up process starts at that state there may be no need to update the flash memory unit memory management data structure 67.

In FIG. 7 a T'th data unit DU 44(T) is stored in the flash memory (within predefined memory region 42) but is not mapped by the flash memory unit memory management data structure 67. Accordingly—when powering up the flash memory controller will read the content of the predefined memory region 42 or a part of it (for example—a part that is not mapped) and find DU 44(T). In this case a recovery process s(update) will be triggered in which both root mapping table 60 and a second level mapping table (for example the R'th second level mapping table 70(R)) will be updated.

Figure 9:
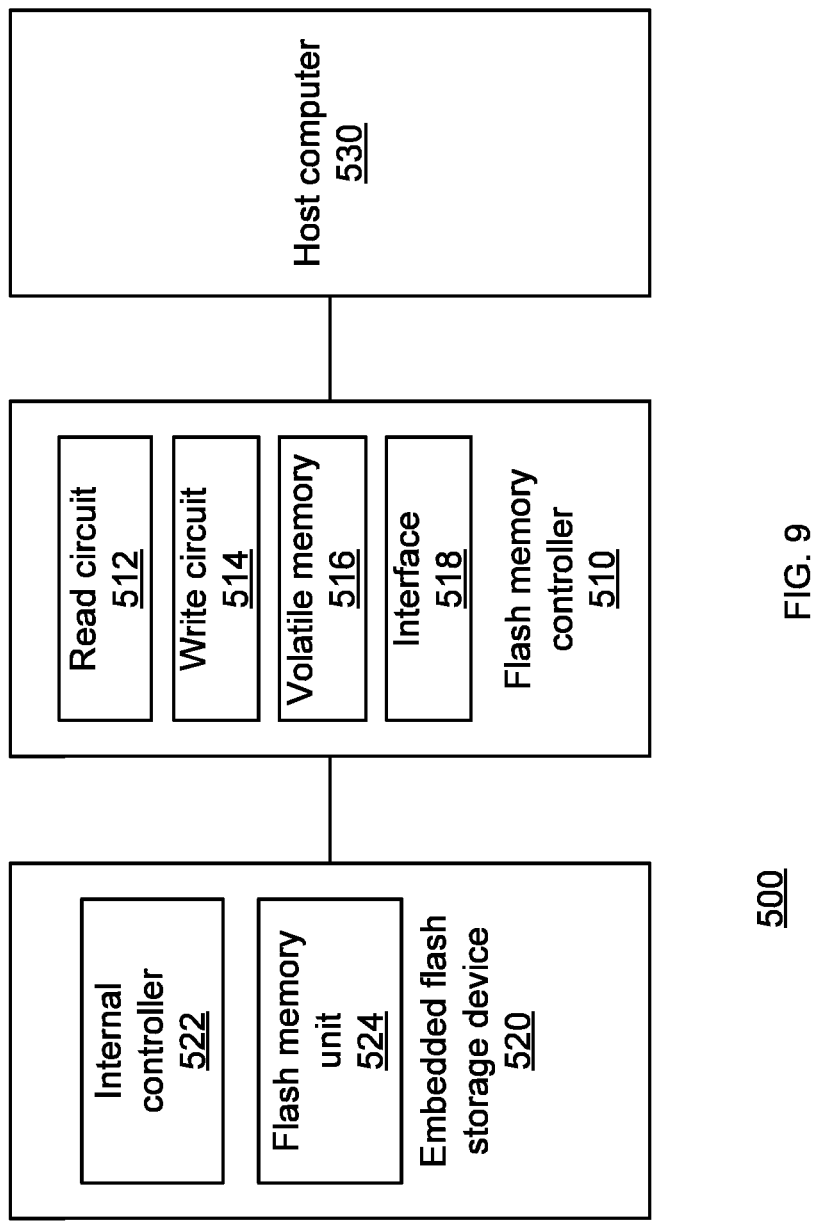
FIG. 9 illustrates a device according to an embodiment of the invention.

Although the example set forth in FIGS. 7-9 refers to an unmapped data unit it is noted that updates may also occur if a data unit was deleted or is mapped to a new physical address.

FIG. 8 illustrates that the new data unit (previously denoted DU 44(T)) is not pointer by entry the (K+1)'th entry of the R'th second level mapping table 70(R) and is now denoted DU 44(R,K+1). Entry 70(K+1) includes a mapping between the least significant part of the logical address "LSB of LA" 71(K+1) and the physical address of the data unit ADD 48(R,K+1). It is noted that the root mapping table is also updating by adding an entry that maps the most significant part of the logical address of DU 44(R,K+1) to the R'th second mapping table.

FIG. 9 illustrates a system 500 according to an embodiment of the invention.

System 500 includes a flash memory controller 510, an embedded flash storage device 520, and a host computer 530. The flash memory controller 510 is coupled to the embedded flash storage device 520 and to the host computer 530.

The embedded flash storage device 520 includes an internal controller 522 and a flash memory unit 524 that may include one or more dies.

The flash memory controller 510 includes a read circuit 512 for reading from the embedded flash storage device 520, a write circuit 514, a volatile memory 516, and an interface 518.

The write circuit 514 is arranged to send to the embedded flash storage device 520 and during a transaction, a data unit and recovery metadata. The recovery metadata differs from a flash memory unit memory management data structure; instruct the embedded flash storage device to program the data unit and the recovery metadata to a group of flash memory cells of a flash memory unit of the embedded flash storage device.

The interface 516 is arranged to send to a host computer a transaction completion indication in response to a successful completion of the programming and before a completion of management process that includes updating the flash memory unit management data structure to reflect (a) the recovery metadata and (b) physical address information related to the group of the flash memory cells; and programming, by the embedded flash storage device, the flash memory management data structure to the flash memory unit. The flash memory management data structure is reconstructible based upon the recovery metadata and the physical address information related to the group of the flash memory cells.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of a subroutine, a function, a procedure, an object method, an object implementation, an executable, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. In addition, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. Moreover, if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method, comprising:
   sending, by a flash memory controller, a data unit and recovery metadata to an embedded flash storage device, wherein the recovery metadata is associated with a logical address of the data unit;
   instructing the embedded flash storage device to initiate a write transaction;
   performing stages of the write transaction and stages of a management process in parallel;
   wherein the stages of the write transaction comprise:
     programming, by the embedded flash storage device, the data unit and the recovery metadata to a flash memory unit of the embedded flash storage device;
     informing, by the embedded flash storage device, the flash memory controller that the programming of the data unit and the recovery metadata succeeded; and
     sending, by the flash memory controller, to a host computer a transaction completion indication in response to a successful completion of the write transaction; and
   wherein the stages of the management process comprise:
     updating, by the flash memory controller, a flash memory unit management data structure to reflect one or more of the recovery metadata and a physical address of the flash memory unit of the embedded flash storage device; and
     programming, by the embedded flash storage device, the flash memory unit management data structure to the flash memory unit of the embedded flash storage device; and
   comparing, by the flash memory controller, a content of the flash memory unit management data structure with a combination of the recovery metadata and the physical address of the flash memory unit.

2. The method according to claim 1, further comprising: reading a content of the flash memory unit during a power-up process, wherein the recovery metadata is retrieved upon power-up.

3. The method according to claim 1, wherein programming the data unit and the recovery metadata to the flash memory unit of the embedded flash storage device comprises writing the data unit and the recovery metadata to the physical address of the flash memory unit.

4. The method according to claim 1, further comprising determining, by the flash memory controller, whether the management process failed.

5. The method according to claim 1, wherein the updating of the flash memory unit management data structure is performed in parallel to programming the data unit.

6. The method according to claim 1, further comprising informing, by the embedded flash storage device, the flash memory controller that the programming of the data unit and the recovery metadata succeeded.

7. The method according to claim 1, wherein the flash memory unit is read during a power up process in order to allow retrieval of the recovery metadata upon power up.

8. A non-transitory computer readable medium that includes instructions to be executed by a computerized system and include instructions for performing the steps of:
sending, by a flash memory controller, a data unit and recovery metadata to an embedded flash storage device, wherein the recovery metadata is associated with a logical address of the data unit;
instructing the embedded flash storage device to initiate a write transaction;
performing stages of the write transaction and stages of a management process in parallel;
wherein the stages of the write transaction comprise:
performing, by the embedded flash storage device, the data unit and the recovery metadata to a flash memory unit of the embedded flash storage device;
informing, by the embedded flash storage device, the flash memory controller that the programming of the data unit and the recovery metadata succeeded; and
sending, by the flash memory controller, to a host computer a transaction completion indication in response to a successful completion of the write transaction; and
wherein the stages of the management process comprise:
updating, by the flash memory controller, a flash memory unit management data structure to reflect one or more of the recovery metadata and a physical address of the flash memory unit of the embedded flash storage device; and
programming, by the embedded flash storage device, the flash memory management data structure to the flash memory unit of the embedded flash storage device; and
comparing, by the flash memory controller, a content of the flash memory unit management data structure with a combination of the recovery metadata and the physical address of the flash memory unit.

9. The non-transitory computer readable medium of claim 8, further comprising:
reading a content of the flash memory unit during a power-up process, wherein the recovery metadata is retrieved upon power-up.

10. The non-transitory computer readable medium of claim 8, wherein programming the data unit and the recovery metadata to the flash memory unit of the embedded flash storage device comprises writing the data unit and the recovery metadata to the physical address of the flash memory unit.

11. The non-transitory computer readable medium of claim 8, further comprising determining, by the flash memory controller, whether the management process failed.

12. The non-transitory computer readable medium of claim 8, wherein the updating of the flash memory unit management data structure is performed in parallel to programming the data unit.

13. The non-transitory computer readable medium of claim 8, further comprising informing, by the embedded flash storage device, the flash memory controller that the programming of the data unit and the recovery metadata succeeded.

14. The non-transitory computer readable medium of claim 8, wherein the flash memory unit is read during a power up process in order to allow retrieval of the recovery metadata upon power up.

15. An embedded flash storage device comprising:
a flash memory controller, the flash memory controller operable to:
send, by the flash memory controller, send a data unit and recovery metadata to the embedded flash storage device, wherein the recovery metadata is associated with a logical address of the data unit;
instruct the embedded flash storage device to initiate a write transaction;
perform stages of the write transaction and stages of a management process in parallel;
wherein the stages of the write transaction comprise:
programming by the embedded flash storage device, the data unit and the recovery metadata to a flash memory unit of the embedded flash storage device;
informing, by the embedded flash storage device, the flash memory controller that the programming of the data unit and the recovery metadata succeeded; and
sending, by the flash memory controller, to a host computer a transaction completion indication in response to a successful completion of the write transaction; and
wherein the stages of the management process comprise:
updating, by the flash memory controller, a flash memory unit management data structure to reflect one or more of the recovery metadata and a physical address of the flash memory unit of the embedded flash storage device; and
programming, by the embedded flash storage device, the flash memory unit management data structure to the flash memory unit of the embedded flash storage device; and
compare a content of the flash memory unit management data structure with a combination of the recovery metadata and the physical address of the flash memory unit.

16. The embedded flash storage device of claim 15, wherein the flash memory controller is further operable to:
read a content of the flash memory unit during a power-up process, wherein the recovery metadata is retrieved upon power-up.

17. The embedded flash storage device of claim 15, wherein programming the data unit and the recovery metadata to the flash memory unit of the embedded flash storage device comprises writing the data unit and the recovery metadata to the physical address of the flash memory unit.

18. The embedded flash storage device of claim 15, wherein the flash memory controller is further operable to determine whether the management process failed.

19. The embedded flash storage device of claim 15, wherein the updating of the flash memory unit management data structure is performed in parallel to programming the data unit.

20. The embedded flash storage device of claim 15, wherein the stages of the management process further comprise informing, by the embedded flash storage device, the flash memory controller that the programming of the data unit and the recovery metadata succeeded.

* * * * *